United States Patent
Arimilli et al.

(10) Patent No.: US 8,028,017 B2
(45) Date of Patent: Sep. 27, 2011

(54) VIRTUAL CONTROLLERS WITH A LARGE DATA CENTER

(75) Inventors: Ravi Kumar Arimilli, Austin, TX (US); Piyush Chaudhary, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 12/424,852

(22) Filed: Apr. 16, 2009

(65) Prior Publication Data

US 2010/0268755 A1    Oct. 21, 2010

(51) Int. Cl.
  *G06F 15/16* (2006.01)
(52) U.S. Cl. .......... 709/201; 710/316
(58) Field of Classification Search .......... None
  See application file for complete search history.

(56) References Cited

U.S. PATENT DOCUMENTS

| | | | | |
|---|---|---|---|---|
| 5,530,897 | A * | 6/1996 | Meritt | 711/100 |
| 6,311,261 | B1 * | 10/2001 | Chamdani et al. | 712/23 |
| 6,629,111 | B1 * | 9/2003 | Stine et al. | 711/171 |
| 6,976,134 | B1 * | 12/2005 | Lolayekar et al. | 710/316 |
| 7,185,169 | B2 * | 2/2007 | Biessener et al. | 711/202 |
| 7,191,277 | B2 * | 3/2007 | Broyles | 710/316 |
| 7,254,813 | B2 * | 8/2007 | Leong et al. | 711/114 |
| 7,313,614 | B2 * | 12/2007 | Considine et al. | 709/223 |
| 7,539,824 | B2 * | 5/2009 | Lolayekar et al. | 710/316 |
| 7,539,991 | B2 * | 5/2009 | Leong et al. | 711/114 |
| 7,836,017 | B1 * | 11/2010 | Srinivasan et al. | 707/634 |

FOREIGN PATENT DOCUMENTS

| | | | |
|---|---|---|---|
| JP | 61170844 A | * | 8/1986 |
| JP | 09330232 A | * | 12/1997 |
| JP | 10091527 A | * | 4/1998 |

OTHER PUBLICATIONS

Srisawat, Jeeraporn et al. "A New 'Quad-Tree-Based' Sub-System Allocation Technique for Mesh-connected Parallel Machines." ICS '99: Proceedings of the 13th international conference on Supercomputing. ACM Press, May 1999. 60-67.*
Coleman, Samuel et al. "The Emergining Paradigm Shift in Storage System Architectures." Proceedings of the IEEE. vol. 81, Issue 4. 1993, IEEE. 607-20.*
Iyengar, Arun. "Scalability of Dynamic Storage Allocation Algorithms." Proceedings of the Sixth Symposium on Frontiers of Massively Parallel Computing. 1996. 223-32.*
Pentakalos, Odysseas et al. "Analytical Performance Modeling of Hierarchical Mass Storage Systems." IEEE Transactions on Computers. vol. 46 Issue 10. IEEE. 1997. 1103-18.*

\* cited by examiner

*Primary Examiner* — Jeffrey R Swearingen
(74) *Attorney, Agent, or Firm* — Dillon & Yudell LLP (57) ABSTRACT

Disclosed are a method, a system and a computer program product for dynamically allocating and/or de-allocating resources and/or partitions that provide I/O and/or active storage access services in a supercomputing system. The supercomputing system can include multiple compute nodes, high performance computing (HPC) switches coupled to the compute nodes, and active non-volatile storage devices coupled to the compute nodes. Each of the compute nodes can be configured to communicate with another compute node through at least one of the HPC switches. In one or more embodiments, each of at least two compute nodes includes a storage controller and is configured to dynamically allocate and de-allocate a storage controller partition to provide storage services to the supercomputing system, and each of at least two compute nodes includes an I/O controller and is configured to dynamically allocate and de-allocate an I/O controller partition to provide I/O services to the supercomputing system.

17 Claims, 4 Drawing Sheets

VIRTUAL CONTROLLERS WITH A LARGE DATA CENTER

This invention was made with United State Government support under Agreement No. HR0011-07-9-002, awarded by DARPA. THE GOVERNMENT HAS CERTAIN RIGHTS IN THE INVENTION.

BACKGROUND

1. Technical Field

The present invention generally relates to supercomputing systems. More specifically, the present invention relates to supercomputing architectures and methods for operating supercomputing architectures.

2. Description of the Related Art

Figure 1:
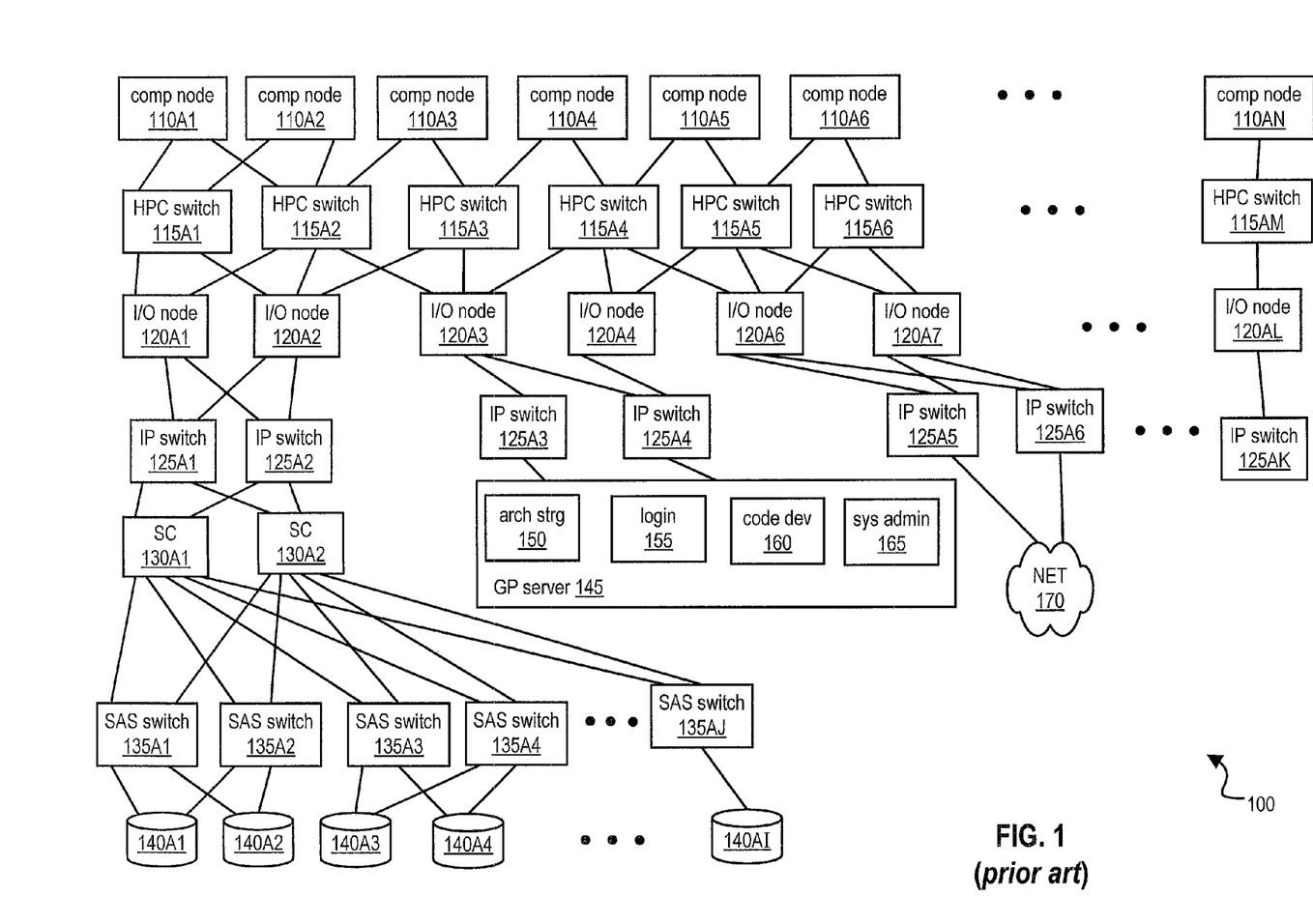
FIG. 1 provides a block diagram of a prior art supercomputing system.

Existing supercomputing architectures include multiple layers of communication in transferring data to and/or from disk storage, archival storage, supporting servers, and/or networks. Multiple hardware components and computer systems are used in implementing these multiple layers of communication, as shown in FIG. 1 which illustrates an exemplary prior art supercomputing system.

As shown, a prior art supercomputing system 100 includes compute nodes (comp nodes) 110A1-110AN (for some non-zero natural number N) coupled to high performance computing (HPC) switches 115A1-115AM (for some non-zero natural number M) coupled to input/output (I/O) nodes 120A1-120AL (for some non-zero natural number L) coupled to Internet protocol (IP) switches 125A1-125AK (for some non-zero natural number K). IP switches 125A1 and 125A2 are coupled to storage controllers (SCs) 130A1 and 130A2 via fiber channel connections, IP switches 125A3 and 125A4 are coupled to a general purpose (GP) server 145 via gigabit Ethernet, and IP switches 125A5 and 125A6 are coupled to a network (NET) 170 (e.g., a wide area network) via gigabit Ethernet. As shown, SCs 130A1 and 130A2 are coupled to serial attached SCSI (SAS) switches 135A1-135AJ (for some non-zero natural number J) which are coupled to JBODs (just a bunch of disks) 140A1-140AI (for some non-zero natural number I). GP server 145 includes services of archival storage 150 (e.g., tape storage), login 155 (e.g., user interface, remote user interface, etc.), code development 160 (e.g., compilers, development framework, debugger(s), profiler(s), simulator(s), etc.), and system administration 165.

In prior art supercomputing system 100, each of SCs 130A1 and 130A2 and I/O nodes 120A1-120AL is a computer system. Each of I/O nodes 120A1-120AL includes HPC host channel adapters (HCAs) to interface with two or more HPC switches 115A1-115AM and includes fiber channel network adapters and/or gigabit Ethernet network adapters to interface with two or more of IP switches 125A1-125AK. Each of SCs 130A1 and 130A2 includes fiber channel network adapters to interface with IP switches 125A1 and 125A2 and includes SAS controller adapters to interface with SAS switches 135A1-135AJ. In one or more implementations of prior art supercomputing system 100, there can be around one thousand five hundred (1500) compute nodes, one hundred twelve (112) I/O nodes, and thirty-two (32) storage controllers.

SUMMARY

Disclosed are a method, a system and a computer program product for dynamically allocating and/or de-allocating resources and/or partitions that provide I/O and/or active storage access services in a supercomputing system. In one or more embodiments, the supercomputing system can include multiple compute nodes, multiple high performance computing (HPC) switches coupled to the compute nodes, and multiple active non-volatile storage devices coupled to the compute nodes. Each of the compute nodes can be configured to communicate with another compute node through at least one of the HPC switches. For example, the compute nodes and the HPC switches can communicate using any of IBM Blue Gene/L TORUS, IBM Blue Gene/L Collective, IBM Federation, Myricom Myrinet, or InfiniBand, among others. In one or more embodiments, each of at least two compute nodes includes a storage controller and is configured to dynamically allocate a storage controller partition to provide storage access services to the supercomputing system, and each of at least two compute nodes includes an I/O controller and is configured to dynamically allocate an I/O controller partition to provide I/O access services to the supercomputing system. In one or more embodiments, each of the compute nodes includes multiple processors to perform computation operations for the supercomputing system.

In one or more embodiments, each of the at least two compute nodes that includes a storage controller can store and retrieve data to and from active non-volatile storage for other compute nodes. For instance, the storage controllers of the at least two compute nodes can interface with the active non-volatile storage. In one or more embodiments, the active non-volatile storage can include JBODs (just a bunch of disks), among others. For example, the storage controllers can be coupled to the JBODs via one or more serial attached SCSI (SAS) switches. In one or more embodiments, each of the at least two compute nodes that includes an I/O controller can communicate data to and from a network for other compute nodes. For example, the I/O controllers of the at least two compute nodes can be coupled to the network through one or more Internet protocol (IP) switches. For instance, the I/O controllers of the at least two compute nodes can be coupled to the one or more Internet protocol (IP) switches via fiber channel, gigabit Ethernet, etc. In one or more embodiments, the network can include and/or be coupled to one or more of a local area network (LAN), a wide area network (WAN), a public switched telephone network (PSTN), and an Internet, among others.

In one or more embodiments, the at least two compute nodes that include I/O controllers and the at least two compute nodes that include storage controllers are operable to dynamically de-allocate respective I/O controller partitions and storage controller partitions and use computing resources formerly utilized by the partitions to perform computation operations for the supercomputing system. In one example, a storage controller partition may use a processor of a compute node to perform storage services and/or functions for the supercomputing system, and when the storage partition is de-allocated, the processor can perform computation operations for the supercomputing system. For instance, the processor may exclusively perform computation operations for the supercomputing system after the storage partition is de-allocated.

BRIEF DESCRIPTION OF THE DRAWINGS

The invention itself, as well as advantages thereof, will best be understood by reference to the following detailed description of one or more embodiments when read in conjunction with the accompanying drawings, wherein.

DETAILED DESCRIPTION

Disclosed are a method, a system and a computer program product for dynamically allocating and/or de-allocating resources and/or partitions that provide I/O and/or active storage access services in a supercomputing system. In one or more embodiments, the supercomputing system can include multiple compute nodes, multiple high performance computing (HPC) switches coupled to the compute nodes, and multiple active non-volatile storage devices coupled to the compute nodes. Each of the compute nodes can be configured to communicate with another compute node through at least one of the HPC switches. For example, the compute nodes and the HPC switches can communicate using any of IBM Blue Gene/L TORUS, IBM Blue Gene/L Collective, IBM Federation, Myricom Myrinet, or InfiniBand, among others. In one or more embodiments, each of at least two compute nodes includes a storage controller and is configured to dynamically allocate a storage controller partition to provide storage access services to the supercomputing system, and each of at least two compute nodes includes an I/O controller and is configured to dynamically allocate an I/O controller partition to provide I/O access services to the supercomputing system. In one or more embodiments, each of the compute nodes includes multiple processors to perform computation operations for the supercomputing system.

In one or more embodiments, each of the at least two compute nodes that includes a storage controller can store and retrieve data to and from active non-volatile storage for other compute nodes. For instance, the storage controllers of the at least two compute nodes can interface with the active non-volatile storage. In one or more embodiments, the active non-volatile storage can include JBODs (just a bunch of disks), among others. For example, the storage controllers can be coupled to the JBODs via one or more serial attached SCSI (SAS) switches. In one or more embodiments, each of the at least two compute nodes that includes an I/O controller can communicate data to and from a network for other compute nodes. For example, the I/O controllers of the at least two compute nodes can be coupled to the network through one or more Internet protocol (IP) switches. For instance, the I/O controllers of the at least two compute nodes can be coupled to the one or more Internet protocol (IP) switches via fiber channel, gigabit Ethernet, etc. In one or more embodiments, the network can include and/or be coupled to one or more of a local area network (LAN), a wide area network (WAN), a public switched telephone network (PSTN), and an Internet, among others.

In one or more embodiments, the at least two compute nodes that include I/O controllers and the at least two compute nodes that include storage controllers are operable to dynamically de-allocate respective I/O controller partitions and storage controller partitions and use computing resources formerly utilized by the partitions to perform computation operations for the supercomputing system. In one example, a storage controller partition may use a processor of a compute node to perform storage services and/or functions for the supercomputing system, and when the storage partition is de-allocated, the processor can perform computation operations for the supercomputing system. For instance, the processor may exclusively perform computation operations for the supercomputing system after the storage partition is de-allocated. One or more methods, systems, and/or computer program products described herein can reduce a number of total devices utilized by a supercomputing system and/or data center to accomplish the same or better functionality over prior supercomputing systems. This reduction can conserve power utilized by a supercomputing system and/or data center. Moreover, this reduction in a number of total devices can reduce maintenance time and/or effort of a supercomputing system which can increase performance of the supercomputing system.

Figure 2:
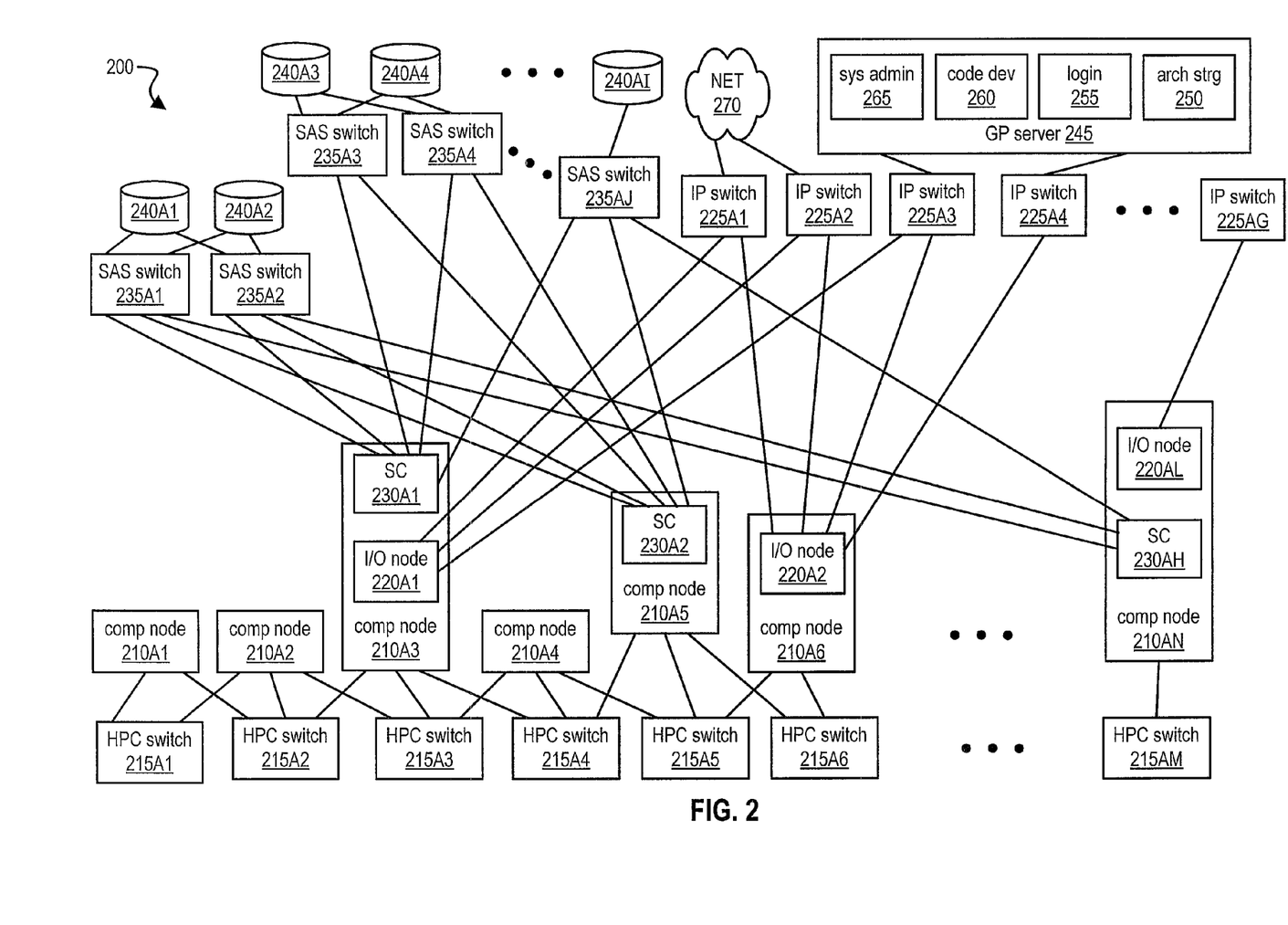
FIG. 2 illustrates a block diagram of an exemplary supercomputing system, according to one or more embodiments.

Turning now to FIG. 2, a supercomputing system is illustrated, according to one or more embodiments. As shown, a supercomputing system 200 can include compute nodes (comp nodes) 210A1-210AN (for some non-zero natural number N) coupled to high performance computing (HPC) switches 215A1-215AM (for some non-zero natural number M). In one or more embodiments, each of compute nodes 210A1-210AN includes one or more HPC host channel adapters (HCAs) that allows communication between the compute node and one or more HPC switches. For example, compute nodes and HPC switches can be operable to communicate using at least one protocol of IBM Blue Gene/L TORUS, IBM Blue Gene/L Collective, IBM Federation, Myricom Myrinet, and InfiniBand, among others. Each of compute nodes 210A1-210AN can include multiple processors to perform computation operations for the supercomputing system and/or to perform input/output (I/O) services and/or functions for the supercomputing system. For example, each of compute nodes 210A1-210AN can include a processing system such as a processing system 300 described below in further detail with reference to FIG. 3.

As shown, compute node 210A3 can include storage controller (SC) 230A1 service or function and I/O node 220A1 service or function, compute node 210A5 can include SC 230A2 service or function, compute node 210A6 can include I/O node 210A2 service or function, and compute node 210AN can include SC 230AN service or function and I/O node 220AN service or function. In one or more embodiments, each of compute nodes 210A3 and 210AN can include an active non-volatile storage controller adapter (e.g., a SAS controller adapter) and a network adapter (e.g., a fiber channel network adapter, gigabit Ethernet adapter, etc.), compute node 210A5 can include a high performance non-volatile storage controller adapter (e.g., a SAS controller adapter), and compute node 220A2 can include a network adapter (e.g., a fiber channel network adapter, gigabit Ethernet adapter, etc.). As illustrated, compute nodes 210A3, 210A5, and 210AN can be coupled to SAS switches 235A1-235AJ (for some non-zero natural number J), and compute nodes 210A3 and 210A6 can be respectively coupled to Internet protocol (IP) switches 225A1-225A3 and 225A2-225A4. Compute node 210AN can be coupled to IP switch 225AG (for some non-zero natural number G), where IP switch 225AG can be coupled to a computer system or network that is not shown.

As illustrated, SAS switches 235A1 and 235A2 can be coupled to JBODs (just a bunch of disks) 240A1 and 240A2, SAS switches 235A3 and 235A4 can be coupled to JBODs (just a bunch of disks) 240A3 and 240A4, and SAS switch 235AJ can be coupled to JBOD (just a bunch of disks) 240AI (for some non-zero natural number I). As shown, IP switches 225A1 and 225A2 can be coupled to a network (NET) 270. In one or more embodiments, NET 270 can include and/or be coupled to one or more of a local area network (LAN), a wide area network (WAN), a public switched telephone network (PSTN), and an Internet. IP switches 225A3 and 225A4 can be coupled to a general purpose (GP) server 245. In one or more embodiments, GP server 245 can include services of archival storage 250 (e.g., tape storage), login 255 (e.g., user interface, remote user interface, etc.), code development 260 (e.g., compiler(s), development framework(s), debugger(s), profiler(s), simulator(s), etc.), and system administration 265. In one or more embodiments, IP switches 225A1-225AG can be coupled to servers, networks, and/or compute nodes via fiber channel, gigabit Ethernet, etc.

In one or more embodiments, a service or function of 230A1, 220A1, 230A2, 220A2, 230AN, and 220AN can include program or processor instructions that execute on one or more processors of a respective compute node. In one or more embodiments, services or functions 230A1, 220A1, 230A2, 220A2, 230AN, and 220AN of supercomputing system 200 can be considered partitions or virtualizations of their computer system counterparts of prior art supercomputing system 100.

Figure 3:
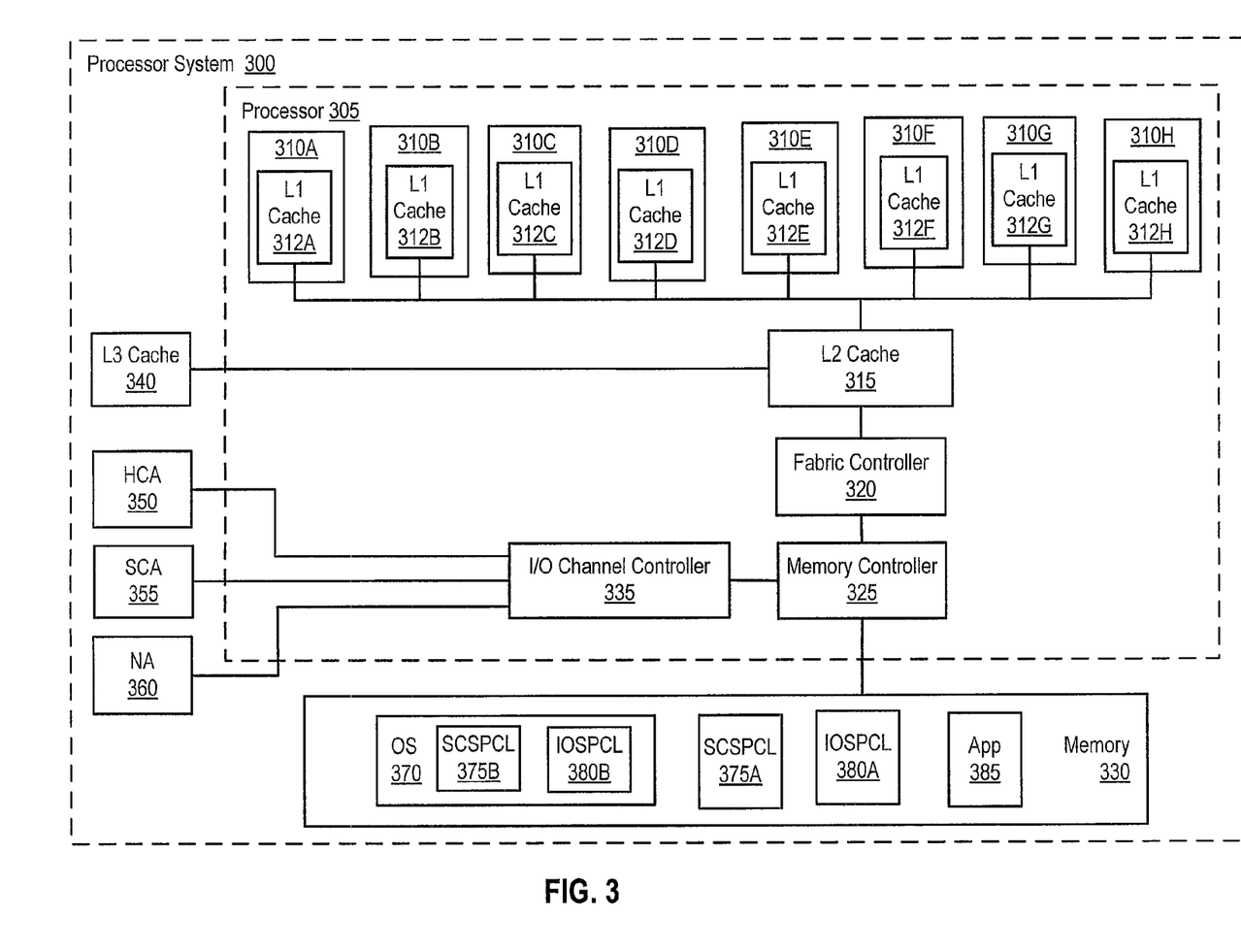
FIG. 3 illustrates a block diagram representation of a processor system, according to one or more embodiments.

Turning now to FIG. 3, there is depicted a block diagram representation of a processor system, according to one or more embodiments. As is illustrated, a processor system 300 includes at least one chip-level multiprocessor (CMP) 305 (only one of which is illustrated in FIG. 3), each of which includes one or more processors 310A-310H (e.g., cores). In one or more embodiments, CMP 305 can correspond to a node (or a portion of a node) of a supercomputing system or HPC cluster.

Processors 310A-310H can, for example, operate in a multithreading (MT) mode or a single thread (ST) mode. When processors 310A-310H operate in the MT mode, processors 310A-310H can employ multiple separate instruction fetch address registers to store program counters for multiple threads. In one or more embodiments, each of processors 310A-310H include a respective first level (L1) cache memory 312A-312H that is coupled to a shared second level (L2) cache memory 315, which is coupled to a shared third level (L3) cache memory 340 and a fabric controller 320. In one or more embodiments, fabric controller 320 can support an interconnect fabric by which processor 305 can communicate and share data with other processors.

As is illustrated, fabric controller 320 is coupled to a memory controller (e.g., included in a Northbridge) 325, which is coupled to a memory subsystem 330. For example, memory subsystem 330 can provide storage where data and/or processor instructions/code can be stored and/or retrieved. In one or more embodiments, memory subsystem 330 can include a random access memory and/or computer system memory such as DRAM, SRAM, EDO RAM, Rambus RAM, NVRAM, EPROM, EEPROM, flash memory, etc. Memory subsystem 330 can include other types of memory as well, or combinations thereof. Memory subsystem 330 includes an application appropriate amount of volatile and/or non-volatile memory. For example, memory subsystem 330 can include an amount of volatile and/or non-volatile memory to store utility or application 385 such that application 385 can be executed by processor 305.

In one or more embodiments, fabric controller 320 can be omitted and, in this case, the L2 cache 315 can be directly connected to memory controller 325. Fabric controller 320, when implemented, can facilitate communication between different CMPs and between processors 310A-310H and memory subsystem 330 and can function as in interface in this manner.

It should be appreciated that the various techniques disclosed herein are equally applicable to systems that employ separate L2 caches for each of processors 310A-310H, as well as systems that employ separate L2 and L3 caches for each of processors 310A-310H. Each of the L1, L2, and L3 caches can be combined instruction and data caches or correspond to separate instruction and data caches. As is shown in FIG. 3, memory controller 325 can also coupled to an I/O channel controller (e.g., included in a Southbridge) 335.

In one or more embodiments, I/O channel controller 335 can provide connectivity and control for one or more input devices and/or one or more output devices. In one example, I/O channel controller 335 can be coupled to various non-volatile memory such as a magnetic media, e.g., a hard drive, floppy drive, etc., where data/instructions/code can be stored and/or from where data/instructions/code can be retrieved. In one or more embodiments, processor system 300 can include one or more of a HCA 350, a storage controller adapter (SCA) 355, and a network adapter (NA) or I/O controller 360 coupled to I/O channel controller 335. HCA 350 can couple processor system 300 to one or more HPC switches (e.g., one or more of HPC switches 215A1-215AM). SCA 355 can couple processor system 300 to non-volatile active storage. For example, SCA 355 can couple processor system 300 to one or more SAS switches 235A1-235AJ. For instance, SCA 355 can include a SAS controller adapter. NA 360 can couple processor system 300 to one or more networks and/or network elements. For example, NA 360 can couple processor system 300 to one or more IP switches 225A1-225A4. For instance, NA 360 can couple processor system 300 to one or more networks and/or network elements via fiber channel, gigabit Ethernet, etc.

In one or more embodiments, software/program instructions/code/logic can be stored in memory 330 and executed by processor 305 to complete and/or implement various features described herein. In one example, storage controller software/program instructions/code/logic (SCSPCL) 375A can be stored in memory 330 and executed by processor 305 to utilize SCA 355 to implement and/or complete SC 230A1, 230A2, or 230AN. In a second example, I/O controller software/program instructions/code/logic (IOSPCL) 380A can be stored in memory 330 and executed by processor 305 to utilize NA 360 to implement and/or complete I/O node 220A1, 220A2, or 220AN. In one or more embodiments, an operating system (OS) 370 can be used in conjunction with SCSPCL 375A and/or IOSPCL 380A. In one or more embodiments, OS 370 can include SCSPCL 375B and/or IOSPCL 380B, where SCSPCL 375B and IOSPCL 380B can include logic and/or functionality of respective SCSPCL 375A and IOSPCL 380A.

Figure 4:
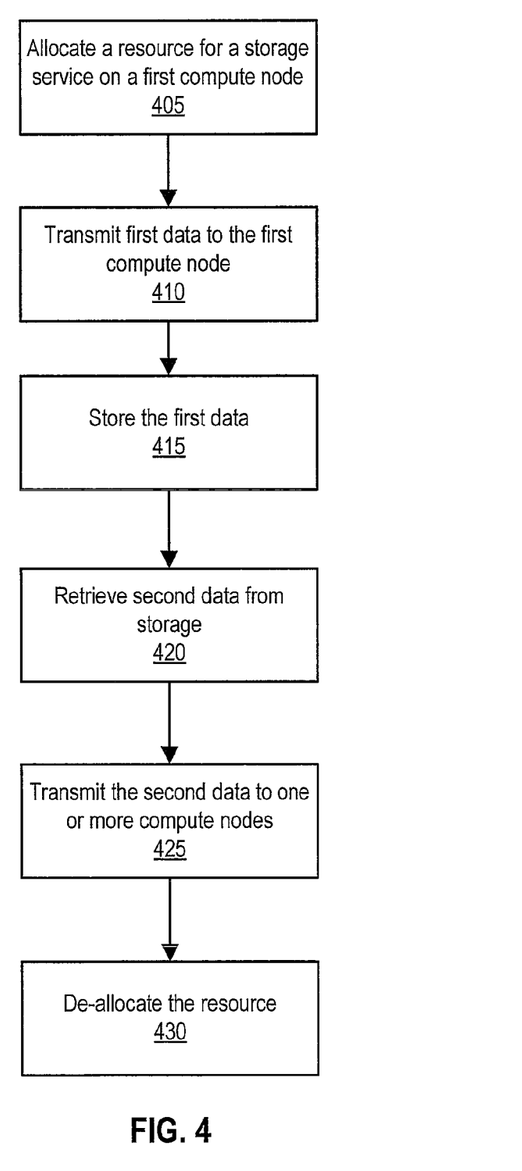
FIG. 4 illustrates a method for operating a storage service or function of a supercomputing system, according to one or more embodiments.

Turning now to FIG. 4, a method for operating a storage service or function of a supercomputing system is illustrated, according to one or more embodiments. The method begins at block 405 where a resource for a storage service is allocated on a first compute node of the supercomputing system. For example, the first compute node can be compute node 210A5, and SC 230A2 can be allocated on compute node 210A5. In one or more embodiments, a processor of the first compute node can be allocated for the storage service. For example, compute node 210A5 can include processor system 300, and processors 310A-310H can be used to perform computation operations for the supercomputing system. For instance, application 385 may be executed on processors 310A-310H to perform computation operations for the supercomputing system. In one example, allocating the resource for the storage service can include allocating processor 310C to be used as or with the resource for the storage service. In one or more embodiments, allocating the resource for the storage service can include allocating a thread of a processor (e.g., a thread of processor 310C) to be used as or with the resource for the storage service. For example, processor 310C can operate in a multithreading mode. For instance, processor 310C can execute application 385 to perform computation operations for the supercomputing system in a first thread, and a second thread can be used as or with the resource for the storage service. In one or more embodiments, allocating the resource for the storage service can be considered creating and/or allocating a partition for the storage service on a compute node of the supercomputing system. For example, SC 230A2 can be considered a storage controller partition for the storage service on the first compute node, and SC 230A2 can be allocated and/or created on compute node 210A5.

At block 410, first data can be transmitted to the first compute node from other compute nodes of the supercomputing system. For example, one or more of compute nodes 210A1-210A4 and 210A6-210AN can transmit the first data to compute node 210A5 via one or more HPC switches 215A1-215AM. At block 415, the first compute node can store the first data. In one or more embodiments, the first compute node can execute software/program instructions/code/logic from a memory to operate a storage controller adapter to store the first data. For example, processor 310C can execute SCSPCL 375A or 375B to operate SCA 355 to store the first data. For instance, SCA 355 can communicate with one or more SAS switches 235A1-235AJ which can communicate with one or more active non-volatile storage units such as JBODs 240A1-240AI that can be used to store the first data.

At block 420, the first compute node can retrieve second data from storage. For instance, the second data can be stored in non-volatile active storage such as one or more of JBODs 240A1-240AI. In one example, processor 310C can execute SCSPCL 375A or 375B to operate SCA 355 to retrieve the second data. For instance, SCA 355 can communicate with one or more SAS switches 235A1-235AJ which can communicate with one or more JBODs 240A1-240AI that can be used to retrieve the second data. At block 425, the first compute node can transmit the second data to one or more other compute nodes of the supercomputing system. For example, compute node 210A5 can transmit the second data to one or more of compute nodes 210A1-210A4 and 210A6-210AN via one or more HPC switches 215A1-215AM. For instance, compute node 210A5 can transmit application 385 and/or data to be used by application 385 to one or more of compute nodes 210A1-210A4 and 210A6-210AN via one or more HPC switches 215A1-215AM.

At block 430, the resource for the storage service is de-allocated on the first compute node. In one or more embodiments, a processor of the first compute node previously allocated for the storage service can be used (again) to perform computation operations for the supercomputing system. For example, the processor may have been used exclusively for the resource for the storage service. For instance, the processor may have been executing SCSPCL 375A or 375B and executes application 385 after the resource for the storage service is de-allocated. In one or more embodiments, de-allocating the resource for the storage service can include de-allocating a thread used as or with the resource for the storage service. For example, processor 310C can cease executing a thread used as or with the resource for the storage service. In one or more embodiments, de-allocating the resource for the storage service can be considered destroying and/or de-allocating a partition for the storage service on a compute node of the supercomputing system. For example, SC 230A2 can be considered a storage controller partition for the storage service on the first compute node, and SC 230A2 can be de-allocated and/or destroyed on compute node 210A5. In one or more embodiments, the resource for the storage service can be dynamically or automatically de-allocated. In one example, after an amount of time transpiring without utilizing the resource for the storage service, the resource for the storage service can be dynamically or automatically de-allocated.

Figure 5:
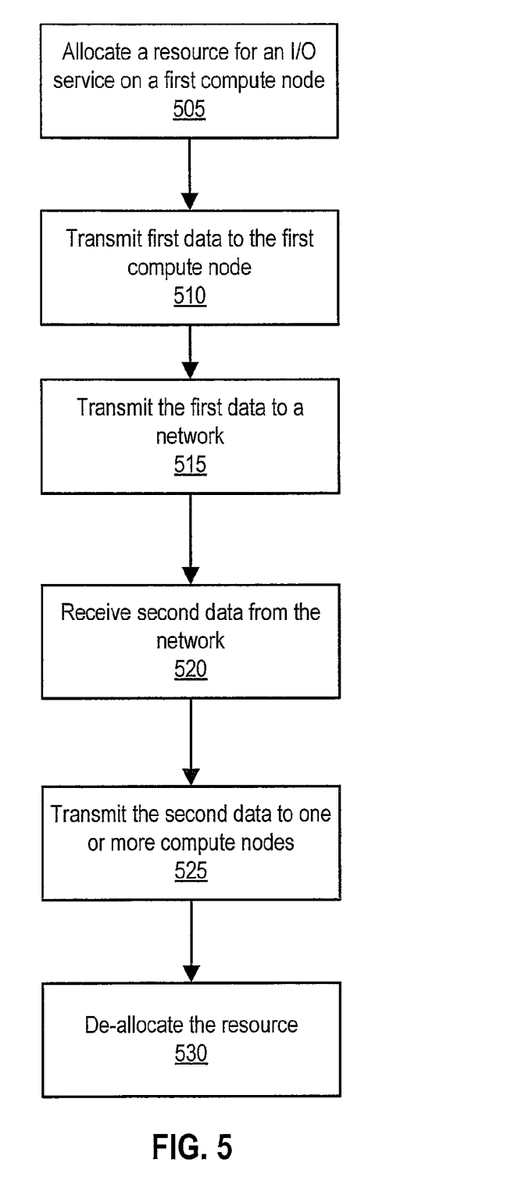
FIG. 5 illustrates a method for operating an I/O service or function of a supercomputing system, according to one or more embodiments.

Turning now to FIG. 5, a method for operating an I/O service or function of a supercomputing system is illustrated, according to one or more embodiments. The method begins at block 505 where a resource for an I/O service is allocated on a first compute node of the supercomputing system. For example, the first compute node can be compute node 210A6, and I/O node 220A2 can be allocated on compute node 210A6. In one or more embodiments, a processor of the first compute node can be allocated for the I/O service. For example, compute node 210A6 can include processor system 300, and processors 310A-310H can be used to perform computation operations for the supercomputing system. For instance, application 385 may be executed on processors 310A-310H to perform computation operations for the supercomputing system. In one example, allocating the resource for the I/O service can include allocating processor 310D to be used as or with the resource for the storage service. In one or more embodiments, allocating the resource for the storage service can include allocating a thread of a processor (e.g., a thread of processor 310D) to be used as or with the resource for the I/O service. For example, processor 310D can operate in a multithreading mode. For instance, processor 310D can execute application 385 to perform computation operations for the supercomputing system in a first thread, and a second thread can be used as or with the resource for the I/O service. In one or more embodiments, allocating the resource for the I/O service can be considered creating and/or allocating an I/O partition for the I/O service on a compute node of the supercomputing system. For example, I/O node 220A2 can be considered an I/O partition for the resource for the I/O service on the first compute node, and I/O node 220A2 can be allocated and/or created on compute node 210A6.

At block 510, first data can be transmitted to the first compute node from other compute nodes of the supercomputing system. For example, one or more of compute nodes 210A1-210A4 and 210A6-210AN can transmit the first data to compute node 210A5 via one or more HPC switches 215A1-215AM. At block 515, the first compute node can transmit the first data to a network (e.g., NET 270). In one or more embodiments, the first compute node can execute software/program instructions/code/logic from a memory to operate a network controller adapter to transmit the first data to the network. For example, processor 310D can execute IOSPCL 380A or 380B to operate NA 360 to transmit the first data to the network. For instance, NA 360 can communicate with one or more IP switches 225A1 and 225A2 which can communicate with NET 270.

At block 520, the first compute node can receive second data from the network. In one example, processor 310D can execute IOSPCL 380A or 380B to operate NA 360 to receive the second data from NET 270. For instance, NA 360 can communicate with one or more EP switches 225A1 and 225A2 which can communicate with NET 270. At block 525, the first compute node can transmit the second data to one or more other compute nodes of the supercomputing system. For example, compute node 210A6 can transmit the second data to one or more of compute nodes 210A1-210A4 and 210A6-210AN via one or more HPC switches 215A1-215AM. For instance, compute node 210A6 can transmit data to be used by application 385 to one or more of compute nodes 210A1-210A4 and 210A6-210AN via one or more HPC switches 215A1-215AM.

At block 530, the resource for the I/O service is de-allocated on the first compute node. In one or more embodiments, a processor of the first compute node previously allocated for the I/O service can be used (again) to perform computation operations for the supercomputing system. For example, the processor may have been used exclusively for the resource for the I/O service. For instance, the processor may have been executing IOSPCL 380A or 380B and executes application 385 after the resource for the I/O service is de-allocated. In one or more embodiments, de-allocating the resource for the I/O service can include de-allocating a thread used as or with the resource for the I/O service. For example, processor 310D can cease executing a thread used as or with the resource for the I/O service. In one or more embodiments, de-allocating the resource for the I/O service can be considered destroying and/or de-allocating a partition for the I/O service on a compute node of the supercomputing system. For example, I/O node 220A2 can be considered a partition for the I/O service on the first compute node, and I/O node 220A2 can be de-allocated and/or destroyed on compute node 210A6. In one or more embodiments, the resource for the I/O service can be dynamically or automatically de-allocated. In one example, after an amount of time transpiring without utilizing the resource for the I/O service, the resource for the I/O service can be dynamically or automatically de-allocated.

In one or more embodiments, the methods illustrated in FIGS. 4 and 5 can be used with compute node 210A3, 210AN, and/or other compute nodes of the supercomputing system. In one example, the method illustrated in FIG. 4 can be used with a first processor of compute node 210A3, and the method illustrated in FIG. 5 can be used with a second processor of compute node 210A3. In a second example, the method illustrated in FIG. 4 can be used with a first thread of a first processor of compute node 210A3, and the method illustrated in FIG. 5 can be used with a second thread of the first processor of compute node 210A3. In one or more embodiments, various services or functions, such as SC 23A2 and I/O node 220A2, can be dynamically allocated and/or de-allocated on various computing nodes which can allow a supercomputing system to perform according to some metric and/or specification.

In one or more implementations of supercomputing system 200, there can be around one thousand five hundred twenty (1520) compute nodes. Thus, one or more implementations of super computing system 200, as described above, can provide one or more advantages and/or improvements over prior art supercomputing system 100. In one example, with an addition of around twenty (20) compute nodes, around one hundred twelve (112) I/O nodes and thirty-two (32) storage controllers can be eliminated without eliminating and/or limiting services and/or functionality provided by these devices. This reduction in a number of total devices can conserve power utilized by a supercomputing system and/or data center. Moreover, this reduction in a number of total devices can reduce maintenance time and/or effort of a supercomputing system which can increase performance of the supercomputing system.

In the flow charts above, one or more of the methods and/or processes are embodied in a computer readable medium including computer readable code such that a series of steps are performed when the computer readable code is executed (by a processing unit). In one or more embodiments, some processes of the methods and/or processes can be combined, performed simultaneously, concurrently (e.g., scheduled quickly enough in time to appear simultaneous to a person), or in a different order, or perhaps omitted, without deviating from the spirit and scope of the invention. Thus, while the method(s) and/or process(es) are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, process, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", and/or "system." Furthermore, the present invention may take the form of an article of manufacture having a computer program product with a computer-usable storage medium having computer-executable program instructions/code embodied in or on the medium.

As will be further appreciated, the method(s) and/or process(es) in embodiments of the present invention may be implemented using any combination of software, firmware, microcode, and/or hardware. As a preparatory step to practicing the invention in software, the programming code (whether software or firmware) will typically be stored in one or more machine readable storage or memory mediums such as fixed (hard) drives, diskettes, magnetic disks, optical disks, magnetic tape, semiconductor memories such as RAMs, ROMs, PROMs, EPROMs, EEPROMs, etc., thereby making an article of manufacture, in one or more embodiments. The medium may be electronic, magnetic, optical, electromagnetic, infrared, or semiconductor system (or apparatus or device) or a propagation medium. Further, the medium may be any apparatus that may include, store, communicate, propagate, or transport the program for use by or in connection with the execution system, apparatus, or device. The method(s) and/or process(es) disclosed herein may be practiced by combining one or more machine-readable storage devices including the code/logic according to the described embodiment(s) with appropriate processing hardware to execute and/or implement the code/logic included therein. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, use of the terms first, second, etc. can denote an order if specified, or the terms first, second, etc. can be used to distinguish one element from another without an ordered imposed.

What is claimed is:

1. A supercomputing system, comprising:
   a plurality of compute nodes;
   a plurality of high performance computing (HPC) switches coupled to the plurality of compute nodes; and
   a plurality of active non-volatile storage devices coupled to the plurality of compute nodes;
   wherein each of the plurality of compute nodes is configured to communicate with another compute node of the plurality of compute nodes through at least one of the plurality of HPC switches;
   wherein each of at least first and second compute nodes of the plurality of compute nodes includes a plurality of processors operable to perform computation operations for the supercomputing system; and
   wherein a resource of a processor among the plurality of processors in the first compute node is dynamically allocated as a storage controller that stores data to and reads data from the plurality of active non-volatile storage devices on behalf of others of the plurality of compute nodes in provision of a storage service and is thereafter deallocated from the storage service and utilized to perform computation operations for the supercomputing system.

2. The supercomputing system of claim 1, wherein:
   the resource is a first resource;
   a second resource of one of the plurality of processors in at least one of the first and second compute nodes is dynamically allocated as an input/output (I/O) controller that provides an I/O service to others of the plurality of compute nodes;
   the second resource is thereafter dynamically deallocated from the I/O service and utilized to perform computation operations for the supercomputing system.

3. The supercomputing system of claim 1, further comprising:
   a server coupled to at least one compute node of the plurality of compute nodes;
   wherein the server is operable to provide, to the supercomputing system, at least one service of a set including a login service, archival storage service, code development service, and system administration service.

4. The supercomputing system of claim 3, wherein:
   the resource is a first resource;
   a second resource of one of the plurality of processors in at least one of the first and second compute nodes is dynamically allocated as an input/output (I/O) controller that provides an I/O service to others of the plurality of compute nodes;
   the supercomputing system further includes one or more Internet protocol (IP) switches coupled to the I/O controller;
   the server is coupled to the I/O controller through the one or more IP switches.

5. The supercomputing system of claim 1, wherein:
   the one or more IP switches are coupled to a network; and
   the I/O controller is configured to provide communications to and/or from others of the plurality of compute nodes and the network.

6. The supercomputing system of claim 5, wherein the network is coupled to one or more of a set including a wide area network (WAN), a local area network (LAN), and an Internet.

7. The supercomputing system of claim 1, wherein the plurality of HPC switches is operable to communicate using at least one protocol of a set including IBM Blue Gene/L TORUS, IBM Blue Gene/L Collective, IBM Federation, Myricom Myrinet, and InfiniBand.

8. The supercomputing system of claim 1, further comprising:
   a plurality of serial attached SCSI (SAS) switches;
   wherein the plurality of active non-volatile storage devices is coupled to the plurality of compute nodes through the plurality of serial attached SCSI (SAS) switches.

9. The supercomputing system of claim 1, wherein the resource is a partition running on the processor.

10. The supercomputing system of claim 1, wherein the resource is a thread of the processor.

11. A method for operating a supercomputing system including a plurality of compute nodes, the method comprising:
    in a first compute node among the plurality of compute nodes, allocating a resource of the first compute node to a storage service, wherein the first compute node includes a plurality of processors operable to perform computation operations for the supercomputing system and wherein the allocating includes allocating as a storage controller of the storage service a resource of a processor among the plurality of processors;
    others of the plurality of compute nodes of the supercomputing system transmitting data to the first compute node for storage by the storage service;
    the first compute node storing the data received from others of the plurality of compute nodes in active storage in provision of the storage service, wherein the storing in the active storage is controlled by the storage controller implemented by the resource of the processor; and
    thereafter, de-allocating from the storage service the resource of the processor on the first compute node allocated as the storage controller for the storage service.

12. The method of claim 11,
    wherein the first compute node includes a memory coupled to the processor;
    wherein the memory includes processor instructions executable by the processor to implement the storage controller;
    wherein the first compute node storing the data in active storage includes the processor executing the processor instructions.

13. The method of claim 11, wherein:
    the resource is a first resource; and
    the method further comprises allocating a second resource for a input/output (I/O) service on the first compute node, wherein said allocating the second resource includes allocating a second resource of one of the plurality of processors for the I/O service.

14. The method of claim 11, and further comprising:
    after said de-allocating, performing computation operations for the supercomputing system utilizing the resource of the processor.

15. The method of claim 11, wherein the plurality of compute nodes of the supercomputing system transmitting data to the first compute node includes the plurality of compute nodes of the supercomputing system transmitting data to the first compute node using at least one protocol of a set including IBM Blue Gene/L TORUS, IBM Blue Gene/L Collective, IBM Federation, Myricom Myrinet, and InfiniBand.

16. The method of claim 11, wherein the resource is a partition running on the processor.

17. The method of claim 11, wherein the resource is a thread of the processor.

* * * * *